3,052,693
STEROID ALKYL ETHERS AND PROCESS THEREFOR

Otto Engelfried, Berlin-Wittenau, and Martin Schenck, Berlin-Frohnau, Germany, assignors to Schering Aktiengesellschaft, Berlin, Germany
No Drawing. Filed Mar. 13, 1959, Ser. No. 799,079
8 Claims. (Cl. 260—397.4)

The present invention relates to steroid alkyl ethers, and more particularly to alkyl ethers of tertiary steroid alcohols which on the same carbon atoms as that to which the tertiary hydroxyl group is linked is also linked an ethinyl group.

It is an object of the present invention to provide for the production of such alkyl ethers of tertiary steroid alcohols which carry an ethinyl group on the same carbon atom as the one which carries the tertiary hydroxyl group.

It is another object of the present invention to provide a new series of compounds of the above type, which compound has in general a greater progesterone-like activity than the non-etherified (i.e. free hydroxyl-group containing) steroids.

It is yet another object of the present invention to provide a method of producing the new compounds of the present invention.

Other objects and advantages of the present invention will be apparent from a further reading of the specification and of the appended claims.

With the above objects in view, the present invention mainly comprises a compound having the following general formula:

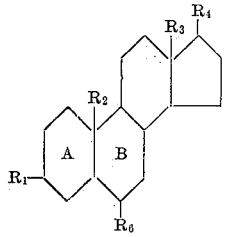

wherein the rings A and B contain between 0 and 3 double bonds, wherein $R_1$ is a radical selected from the class consisting of =O and the ethinyl-containing group

wherein $R_5$ is a lower alkyl radical, wherein $R_2$ is selected from the group consisting of H and $CH_3$; wherein $R_3$ is selected from the group consisting of H and $CH_3$, and wherein $R_4$ is a radical selected from the class consisting of =O, the ethinyl radical-containing group

and the ethinyl radical-containing group

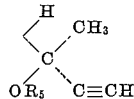

wherein $R_5$ has the same definition as above, at least one of the radicals $R_1$ and $R_4$ being an ethinyl radical-containing group, and wherein $R_6$ is selected from the group consisting of H, OH, O, halogen and lower alkyl radicals.

In the above formula the substituent $R_5$ may be any lower alkyl radical of up to 5 carbon atoms. Preferably, the substituent $R_5$ is either the methyl or ethyl radical.

The compounds of the present invention may be produced by subjecting the starting compound, that is a compound of the above general formula wherein $R_5$ is hydrogen to alkylation of the tertiary hydroxyl group of the ethinyl radical-containing group by means of a lower alkyl radical-containing alkylating agent such as methyl iodide after; if necessary, blocking any other radicals which may be reactable with the alkylating agent. Where such blocking is necessary, the final product is obtained by subsequently removing the blocking agent. The reaction with the alkylating agent can be in general carried out according to known methods.

Thus, in accordance with the present invention, the starting material, that is a compound of the above general formula wherein $R_5$ hydrogen (hereinafter referred to as tertiary steroid alcohol) is first converted to the corresponding alcoholate with metallic sodium by reaction in liquid ammonia, preferably in the presence of a trace of ferric nitrate, and then etherified to the chosen alkyl ether by reaction with an alkylating agent such as methyl iodide, preferably dissolved in an inert organic solvent such as tetrahydrofurane. The produced alkyl ether is then separated from the reaction mixture in the usual manner.

Other groups in the tertiary steroid alcohol, such as secondary hydroxyl group, keto groups, and the like, which are reactable with the alkylating agent are blocked in known manner by conversion into non-reactable functional derivatives such as esters, semicarbazones, or the like in order to protect these groups from the action of the alkylating agent. After the alkylation of the tertiary alcohol group the resulting compound is reconverted into a compound in which the blocked groups are reintroduced into the molecule. This is also done in known manner.

According to the preferred embodiment of the present invention the alkyl ethers thereof are the lower 17-alkyl ethers of 17-ethinyl-testosterones, particularly, the 17-methyl ethers. These compounds, as is the case with all of the compounds of the present invention, are therapeutically valuable with respect to the progesterone-like activity thereof. The progesterone-like activity compounds of the present invention are greater than that of the initial ethinyl-tertiary steroid alcohols. Thus, the progesterone-like activity of ethinyl-testosterone is increased by about ten times in accordance with the present invention by etherification of the tertiary hydroxyl group thereof. Similarly, increased activity occurs by etherification of the tertiary hydroxyl group of the already strongly active 17-ethinyl-19-nor-testosterone.

The following examples are given to further illustrate the present invention. The scope of the invention is not, however, meant to be limited to the specific details of the examples.

Example I 0.46 g. of metallic sodium are added in portions in small pieces to approximately 150 cc. of ammonia at a temperature of between −80 and −60° C., after the addition thereto of a trace of ferric nitrate. After the blue color disappears, 6.3 g. of 17-ethinyl-androstene-3,17-diol in 100 cc. of tetrahydrofurane are added dropwise during a time period of 10 minutes, and the mixture is subsequently stirred for one to two hours. Thereafter, 1.25 cc. of methyl iodide dissolved in 10 cc. of tetrahydrofurane are added and the stirring is continued for an additional 3 hours. The reaction mixture is then poured onto ice and acidified with acetic acid. The separated solid substance is filtered off and washed until neutral. The crude reaction product, preferably after prior acetylation, is subjected to alumina-chromatography in order to remove the non-reacted starting material. There is in this manner obtained 3-acetoxy-17-methoxy-17-ethinyl-androstene having a melting point of 166–168° C.

Instead of tetrahydrofurane another solvent can be used, as for example dimethylformamide.

The 3-acetoxy-17-methoxy-17-ethinyl-androstene obtained in the above manner is, after saponification to the 3-hydroxyl compound (melting point equals 168.5–170.5° C.) in known manner oxidized according to the method of Oppenauer to the 17-ethinyl-testosterone-17-methyl ether. After several recrystallizations, the melting point of the compound is found to be 129–131° C.

$$(\alpha)_D = +15°$$

(in dioxane).

Absorption in ultraviolet light: $\epsilon_{241} = 16,300$
Infra-red spectrum:
   No OH-band is discernible
   Ethinyl bands at 3.10 and 4.77$\mu$
   $\Delta^4$-3-keto bands at 5.98 and 6.17$\mu$
   Ether band at 9.12$\mu$

Example II 0.23 g. of sodium in small pieces are introduced gradually into approximately 70 to 80 cc. of liquid ammonia containing a trace of ferric nitrate at a temperature of −70° C. After the blue color disappears, a suspension of 3.12 g. of ethinyl-testosterone in 50 cc. of tetrahydrofurane are added and a reaction mixture is stirred for one hour. Subsequently, 0.63 cc. of methyl iodide in 5 cc. of tetrahydrofurane are added dropwise and the reaction mixture stirred for an additional three hours. The reaction mixture is then poured onto ice, acidified with acetic acid, and the precipitated product filtered off and washed until neutral. The product is separated from non-converted starting material by extraction with ether and fractional crystallization of the portion which is easily soluble in ether from methylene chloride-hexane. There is thus obtained the ethinyl-testosterone-methyl ether having a melting point of 124–128° C. No melting point depression occurs with the substance obtained from Example I.

Example III 17-ethinyl-19-nor-androstene-3,17-diol is reacted under the conditions set forth in Example I and then worked up in the same manner. The obtained oily, crude product is oxidized in known manner according to the method of Oppenauer. After chromatography on alumina the compound 17-ethinyl-19-nor-testosterone-methyl ether is obtained having the following characteristics:

Melting point: 122.5–124.5° C.
Absorption in ultraviolet light: $\epsilon_{240} = 16,650$
Infra-red spectrum:
   Ethinyl band at 3.04$\mu$
   $\Delta^4$-3-keto bands at 6.00 and 6.19$\mu$
   Ether band at 9.17$\mu$ This compound given subcutaneously in the Clauberg test is found to have six times the activity of the non-etherified 17-ethinyl-19-nor-testosterone.

Example IV

After the addition of a trace of ferric nitrate to approximately 200 to 250 cc. of liquid ammonia, 0.83 g. of small pieces of metallic sodium are added thereto at a temperature of −80 to −60° C. After the disappearance of the blue color 9.45 g. of 17$\alpha$-ethinyl-$\Delta^5$-androstene-3$\beta$,17-diol in 150 cc. of tetrahydrofurane are added. After one hour 3 cc. of ethyl iodide in 15 cc. of tetrahydrofurane are added and the mixture is stirred for approximately fifteen hours. The reaction mixture is then poured onto ice, acidified, and the precipitated product filtered off and washed until neutral. For the separation of the main portion of non-reacted poorly soluble starting material the crude reaction product is extracted under mild warmth with benzene and the benzene solution subjected to chromatography on alumina (according to the method of Brockmann). The main product which is obtained in preponderant amount is 17$\alpha$-ethinyl-17-ethoxy-$\Delta^5$-androstene-3$\beta$-ol having a melting point of 161–164.5° C. As side product in small amount there is obtained the 3,17-diethyl ether having a melting point of 113–114.5° C.

The isolation of the mono-ethyl ether can be accomplished through the production of the 3-acetate analogously to the method described in Example I. There is obtained in this manner the 3-acetoxy-17$\alpha$-ethinyl-17-ethoxy-$\Delta^5$-androstene having a melting point of 124.5–125.5° C.

Ethyl bromide can be used in the above process in place of ethyl iodide iodide. By Oppenauer oxidation in known manner the above compound can be converted (after formation of the 3-hydroxy compound) to form finally the 17-ethinyl-testosterone-ethyl ether having a melting point of 105–108° C.

Absorption in ultraviolet light:
   $\epsilon_{240} = 17,160$
Infra-red spectrum:
   Ethinyl bands at 3.1 and 4.78$\mu$
   3-keto band at 6.0$\mu$
   $\Delta^4$-band at 6.2$\mu$
   Ether band at 9.25$\mu$ Upon subcutaneous application of the 17-ethinyl-testosterone-ethyl ether the activity thereof in the Clauberg test is found to be ten times as great as the corresponding non-etherified free 17-hydroxyl compound.

Example V

After addition of a trace of ferric nitrate to approximately 150 cc. of liquid ammonia, 0.441 g. of small pieces of cut metallic sodium are added slowly thereto at a temperature of −80 to −60° C. After disappearance of the blue color, 4.96 g. of 17$\alpha$-ethinyl-$\Delta^{1,4}$-androstadiene-17-ol-3-one in 100 cc. of tetrahydrofurane are added dropwise. After one and one-half hours 1.5 cc. of methyl iodide in 10 cc. of tetrahydrofurane are added to the reaction mixture and the reaction mixture is stirred an addition three hours. It is thereupon poured onto ice, acidified with acetic acid, and the precipitated reaction product taken up in ether. The neutral-washed ether solution after drying over sodium sulfate is evaporated, the residue taken up in benzene and subjected to chromatography on aluminum oxide (according to the method of Brockmann). There is thus obtained 17$\alpha$-ethinyl-$\Delta^{1,4}$-androstadiene-17-ol-3-one-methyl ether which after recrystallization from hexane melts at 134.5–135.5° C.

Absorption in ultraviolet light:
   $\epsilon_{203} = 4,160$
   $\epsilon_{243} = 16,020$
Infra-red spectrum:
   "All known characteristics present."

The activity of the produced compound by the Clauberg test upon subcutaneous administration is found to be three to four times greater than the compared non-etherified steroid alcohol.

Example VI

17α-ethinyl-Δ$^{4,6}$-androstadiene-17-ol-3-one is reacted and worked up under analogous condition to those described in Example V. The oily separated crude product is taken up in ether, the ether solution washed with water and dried over sodium sulfate. The non-reacted, difficulty soluble starting material separates upon concentration of the ether solution. The easily soluble portion remaining in the ether solution is the reaction product. This is separated from the ether by evaporation of the ether, taken up in benzene and subjected to chromatography on aluminum oxide (according to the method of Brockmann). There is thus obtained 17α-ethinyl-17-methoxy-Δ$^{4,6}$-androstadiene-3-one having a melting point of 96.5–98.5° C.

Absorption in ultraviolet light:
$\epsilon_{284}=26,420$
Infra-red spectrum:
Ethinyl bands at 3.09 and 4.75μ
3-keto band at 6.00μ
Δ$^4$-band at 6.17μ
Δ$^6$-band at 6.29μ
Ether band at 9.12μ

This compound is found to have three to four times the activity of the non-etherified compound.

The same compound can be produced in better yield from 17α-ethinyl-17-methoxy-Δ$^5$-androstene-3β-ol (produced according to Example I) by dehydration by means of quinone in boiling toluene in the presence of aluminum isopropylate.

The analogous 17α-ethinyl-17-ethoxy-Δ$^{4,6}$-androstadiene-3-one having a melting point of 125–127° C. can be produced from 17α-ethinyl-17-ethoxy-Δ$^5$-androstene-3β - ol (produced according to Example IV). This ether is found to have three to four times the activity of the non-etherified compound.

Example VII

17α - ethinyl - 6α - methyl - Δ$^4$-androstene-17-ol-3-one is etherified and worked up in an analogous manner to that described in Example V. The crude product is extracted with ether to remove the non-reacted sarting material which is only poorly soluble therein. The ether solution is evaporated and the residue dissolved in benzene is subjected to chromatography on aluminum oxide (according to the method of Brockmann). There is thus obtained 17-ethinyl-6α-methyl-testosterone-methyl ether having a melting point of 133–135° C.

Absorption in ultraviolet light: $\epsilon_{241}=15,370$
Infra-red spectrum:
Ethinyl bands at 3.06 and 4.75μ
3-keto band at 5.98μ
Δ$^4$-band at 6.20μ
Ether band at 9.14μ

The same compound can also be produced from 17α-ethinyl - 17 - methoxy - 5,6-oxido-androstane-3β-ol whose acetate (obtainable from 17α-ethinyl-17-methoxy-Δ$^5$-androstene-3β-ol or acetate (see Example I) is obtained in known reaction sequence through the following steps:

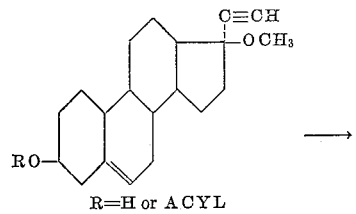
R=H or ACYL

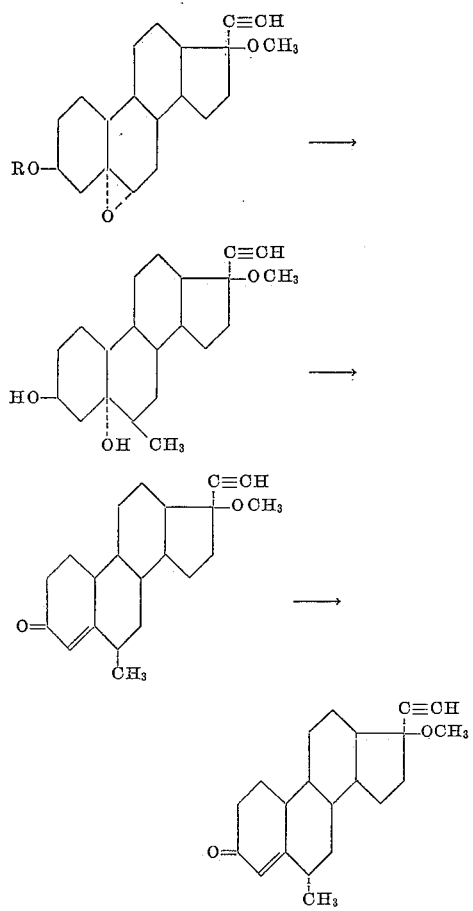

The 17-ethinyl-6α-methyl-testosterone-methyl ether of this example is found to be active in the Clauberg test in an amount of 0.2 mg. subcutaneously.

Example VIII 3-ethinyl-androstane-3,17β-diol is etherified analogously to Example I. The crude reaction product is acetylated and subjected to chromatography on aluminum oxide (according to the method of Brockmann). There is thus obtained 3 - ethinyl - 3-methoxy-androstane-17β-ol-acetate having a melting point of 160–162° C. The corresponding 17-OH-compound (having a melting point of 158–159° C.) is produced by alkaline saponification, and the hydroxyl compound is then oxidized according to the method of Oppenauer to the 3-ethinyl-3-methoxy-androstane-17-one having a melting point of 125.5–127° C.

Infra-red spectrum:
Ethinyl bands at 3.00 and 4.74μ
17-keto band at 5.74μ
Ether band at 9.17μ

Example IX

After the addition of the trace of a ferric salt to 250 cc. of liquid ammonia, 1.01 g. of sodium is introduced thereto under stirring at a temperature of —80 to —70° C. After the disappearance of the blue color 7.61 g. of 17α-ethinyl-estradiol-3-tetrahydropyranyl ether in 150 cc. of tetrahydrofurane is added dropwise during a time period of 1–2 hours. After an additional hour 2.75 cc. of methyl iodide in 10 cc. of tetrahydrofurane are added and the reaction mixture is further stirred for several hours (maximum of fifteen hours). The reaction mixture is poured onto ice and acidified with concentrated acetic acid. The reaction product is extracted with ether and the ether solution is washed with water until neutral. The solution is dried over sodium sulfate and then evaporated. The reaction product in crude form which precipitates in the form of a foamy residue is, without purification, treated to split off the tetrahydropyranyl ether, as follows:

The product is dissolved in 240 cc. of methylene chloride, mixed with 80 cc. of methanol and about 25–30 drops of concentrated hydrochloric acid is added thereto. After standing for one hour at room temperature the reaction solution is washed with water and dried over sodium sulfate. After evaporation of the solvent there is obtained 17α-ethinyl-estradiol-17-monomethyl ether which starts to sinter at 162° C. and then melts at 167–171° C. After recrystallization from methanol the pure substance melts at 170.5–172° C.

Absorption in ultraviolet light:
$\epsilon_{285}=1,960$
$\epsilon_{230}=2,170$
$\epsilon_{205}=18,170$

*Example X*

After the addition of a small amount of a crystalline ferric salt to 150 cc. of liquid ammonia, 0.45 g. of sodium are slowly added under stirring at a temperature of −80– 60° C. After disappearance of the blue color a solution of 6.85 g. of 20α-ethinyl-Δ⁵-pregnene-3β-20-diol having a melting point of 240.5–243° C. (obtained from Δ⁵-pregnene-3β-ol-20-one-acetate by ethinylation according to the usual methods) in 200 cc. of tetrahydrofurane are added dropwise and the reaction mixture is stirred for an additional hour. The reaction mixture is subsequently reacted with a solution of 1.25 cc. of methyl iodide in 10 cc. of tetrahydrofurane, after the addition of which the reaction mixture is stirred for three hours at the above mentioned temperature. The reaction mixture is then poured onto ice and acidified with concentrated acetic acid. The precipitated reaction product is filtered and washed until neutral. For the removal of the non-reacted starting material the crude product precipitated in benzene is subjected to chomatography on an aluminum oxide column. There is thus obtained 20α-ethinyl-20-methoxy-Δ⁵-pregnene-3β-ol, which after recrystallization from acetic ester melts at 182–184° C. By Oppenauer oxidation (conditions analogous to Example I) there is obtained the compound 20α-ethinyl-20-methoxy-Δ⁴-pregnene-3-one, which after recrystallation from acetic ester melts at 213–215° C.

Absorption in ultraviolet light: $\epsilon_{241}=16,430$

*Example XI*

17α-ethinyl-testosterone-methyl ether is dehydrogenated by chloranil by several hours of heating in amyl alcohol. After the end of the reaction the reaction mixture is evaporated under vacuum, the residue taken up in methylene chloride, the solution washed repeatedly with sodium dithiosulfite solution ($Na_2S_2O_4$) and two times with 0.1 normal sodium hydroxide solution and subsequently with water. The methylene solution is evaporated, the residue taken up in benzene and then subjected to chromatography on silica gel which was subjected to a calcining treatment and then mixed with 10% water. The benzene eluate was discarded, the material is washed with chloroform and the chloroform eluate is then evaporated. The residue is taken up in benzene, purified and subjected to chromatography on aluminum oxide (according to the method of Brockmann). The crystallized fractions are recrystallized from hexane. There is obtained in this manner 17α - ethinyl - 17-methoxy-Δ¹,⁴,⁶-androstatriene-3-one having a melting point of 168–170° C.

Absorption in ultraviolet light:
$\epsilon_{206}=11,090$
$\epsilon_{223}=11,340$
$\epsilon_{256}=10,720$
$\epsilon_{302}=11,930$ The same substance can be produced starting from 17α-ethinyl-17-methoxy-Δ¹,⁴-androstadiene-3-one. The compound produced in this example is active in the Clauberg test in an amount of 0.3 mg. administered subcutaneously.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. The compound 17-ethinyl-19-nor-testosterone-17-methyl ether.
2. The compound 17α-ethinyl-Δ¹,⁴-androstadiene-17-ol-3-one-17-methyl ether.
3. The compound 17α-ethinyl-17 - methoxy - Δ⁴,⁶ - androstadiene-3-one.
4. The compound 17α-ethinyl-17-ethoxy-Δ⁴,⁶-androstadiene-3-one.
5. The compound 17-ethinyl-6α-methyl-testosterone-17-methyl ether.
6. The compound 20α-ethinyl-20-methoxy-Δ⁴-pregnene-3-one.
7. The compound 17α-ethinyl-17-methoxy-Δ¹,⁴,⁶-androstatriene-3-one.
8. The method of producing alkyl ethers of tertiary steroid alcohols which carry an ethinyl group on the same carbon atom as the one which carries the tertiary hydroxyl group, which comprises subjecting a compound of the formula:

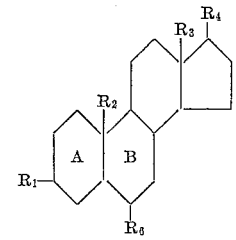

wherein the rings A and B are selected from the group consisting of rings which are free of double bonds and rings containing double bonds in position selected from the group consisting of $$\Delta^4, \Delta^{5(10)}, \Delta^{1,4}, \Delta^{4,6} \text{ and } \Delta^{1,4,6}$$

wherein $R_1$ is selected from the group consisting of =O and the first ethinyl radical-containing group

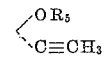

wherein $R_5$ is hydrogen, wherein when $R_1$ is said first ethinyl radical-containing group $R_4$ is =O and when $R_1$ is =O $R_4$ is selected from the group consisting of the second ethinyl radical-containing group

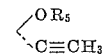

and the third ethinyl radical-containing group

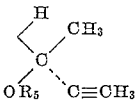

wherein $R_5$ is hydrogen, wherein when $R_4$ is said second ethinyl radical-containing group $R_2$ is selected from the group consisting of H and $CH_3$, $R_3$ is $CH_3$ and $R_6$ is selected from the group consisting of H and lower alkyl radicals, and when $R_4$ is said third ethinyl radical-containing group $R_2$ and $R_3$ are both $CH_3$ and $R_6$ is H, to etherification of the tertiary hydroxyl group of said ethinyl radical-containing group with a lower alkyl alkylating agent after blocking any other radical reactable with said alkylating agent by forming with said radical a group which is not reactable with said alkylating agent, and subsequently reconverting such formed group after said etherification of said tertiary hydroxyl group to the original radical, thereby forming said compound wherein $R_5$ is a lower alkyl radical.

References Cited in the file of this patent

UNITED STATES PATENTS

| | | |
|---|---|---|
| 2,280,236 | Inhoffen et al. | Apr. 21, 1942 |
| 2,305,727 | Miescher et al. | Dec. 22, 1942 |
| 2,318,105 | Ruzicka | May 4, 1943 |
| 2,374,369 | Miescher et al. | Apr. 24, 1945 |
| 2,837,464 | Nobile | June 3, 1958 |

FOREIGN PATENTS

| | | |
|---|---|---|
| 1,010,963 | Germany | June 27, 1957 |

OTHER REFERENCES

Djerassi et al.: J. Am. Chem. Soc. 76, 4092–4094 (1954).

Mancera et al.: J. Am. Chem. Soc. 77, 5673–5676 (1955).

Ringold et al.: J. Am. Chem. Soc. 78, 2477–2479 (1956).

Ackroyd et al.: J. Chem. Soc. (Gr. Br.) 1957, pages 4099–4111.